Oct. 17, 1961       N. M. WINSLOW       3,004,862
HYDROCARBONACEOUS RESIN IMPREGNATED MATERIAL
AND METHOD OF PREPARING SAME
Filed March 25, 1960

NATHANIEL M. WINSLOW
INVENTOR.

BY
*Dawson, Tilton & Graham*

3,004,862
HYDROCARBONACEOUS RESIN IMPREGNATED MATERIAL AND METHOD OF PREPARING SAME
Nathaniel M. Winslow, 2115 Riverside Drive, Cleveland 7, Ohio
Filed Mar. 25, 1960, Ser. No. 17,711
16 Claims. (Cl. 117—61)

This invention relates to resin impregnated materials and the preparation thereof, and particularly to porous materials impregnated with resins prepared from high boiling aromatic hydrocarbons.

The present application is a continuation-in-part of my copending application, Serial No. 794,463, filed February 19, 1959, which is a continuation-in-part of my application, Serial No. 730,735 (now abandoned), and my application Serial No. 394,878, filed November 27, 1953 (now abandoned).

In my copending application, Serial No. 298,611, filed July 12, 1952 (now abandoned), I have described the preparation of resins from high boiling aromatic hydrocarbons and particularly the preparation of resins by reacting coal tar pitch with an oxidizing agent.

The present invention relates particularly to the application of such resins to the impregnation of porous materials, and to the preparation of impregnated materials having especially desirable characteristics of chemical and temperature resistance.

I have discovered that by reacting coal tar pitch with an oxidizing agent, under certain conditions, a resin is formed which is thermoplastic, thermosetting or thermoset, and that the resin may be formed in situ within the portion of an impregnated object. The resin may have a draw point of 150–275° C., the lower draw point being particularly useful in combination with cellulose fibers, such as wood flour, cotton fibers and a cellulose floc, which would be adversely affected by high forming temperatures. In carrying out the processes, excessive temperatures which would destroy the resin are avoided and heating is discontinued after the resin, or partial resin, has been formed within the porous material. For example, said heating is discontinued or terminated at a temperature below 400° C., and for some results, the heating is terminated below 250° C. The resin may be a thermosetting resin or also a reacted resin which is thermoplastic and not thermosetting due to the fact that the product is not carried through by heating to a complete cure or to the fact that the reacting material does not have a sufficient amount of oxidizing agent to bring about a complete cure.

Figure 1:
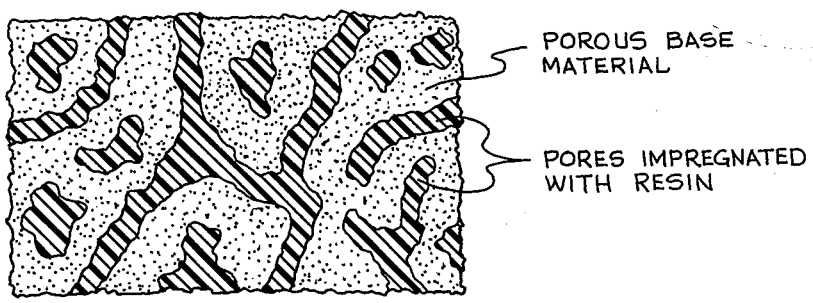
Figure 2:
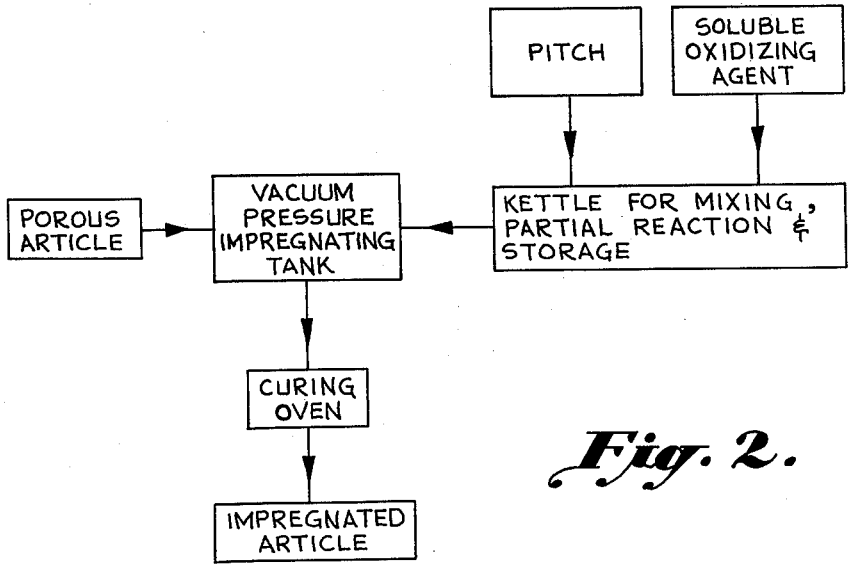

The invention is illustrated in the accompanying drawings, in which FIG. 1 is an enlarged fragmentary sectional view of the impregnated product showing the pores in the product and the resin distributed throughout the pores; and FIG. 2 is a flow sheet showing the different steps of the process.

An important phase of the present invention is the impregnating of a porous material with a thermosetting pitch substance containing throughout a soluble oxidizing agent so that after the fluid material has been thoroughly introduced through the pores of the solid, heat alone is then effective in producing a setting of the resin to an insoluble and infusible state. In one embodiment of the invention, the pitch material, when introduced into the pores of the solid, contains a soluble oxidizing agent which is at least partially unreacted and the heat-curable resin is reduced to a final insoluble state in situ. By having the oxidizing agent distributed uniformly throughout the fluid mixture, the final formation of the infusible resin is accomplished while within the pores of the solid.

In attempting to impregnate porous materials with my resins, difficulties are encountered if the pores of the material are at all small. When my resins are substantially completely cured, they are substantially infusible and relatively insoluble, and cannot, therefore, be readily introduced into a porous material. Moreover, even if my resins are only partially cured so that they are in the heat-curable fusible state, they are difficult to introduce into porous materials. If the partial cure is even moderate, the resin is a solid at temperatures approaching 200° C., and even if heated to a temperature at which it softens or eventually becomes liquid, the viscosity is too great to permit ready introduction into small openings.

In addition, when the partial cure is carried on to even a moderate extent, the temperature at which the resin becomes even a highly viscous liquid is so high that the cure progresses very rapidly at this temperature. Accordingly, the increase in viscosity and ultimate solidification of the resin prevents holding the resin at such a temperature in the fluid state while the impregnation takes place.

In accordance with the present invention, the reaction ingredients comprising the coal tar pitch and oxidizing agent are mixed together, heated to a temperature at which the mixture is fluid, and introduced into the porous material after either a very slight reaction to produce a resin which is only slightly cured, or without any appreciable or substantial reaction prior to introduction into the porous material. Thereafter the curing reaction is completed in such a manner that the resin, in its substantially infusible, relatively insoluble, state is formed within the voids of the porous material.

Pitch which is suitable for use in the invention may, as set forth in my copending application, Serial No. 298,611, filed July 12, 1952 (now abandoned), be a solid, semi-solid or viscous liquid material, essentially hydrocarbon in nature, and susceptible to softening, melting or lowering of viscosity on application of heat, which (a) has at 25° C. a specific gravity of 1.02 or greater referred to water at 4° C., and (b) when heated for 72 hours at 450° C. in a closed vessel where distillation is not possible, will yield at least 60% solid material based on the weight of the pitch so heated, which solid material, on further heating to 950° C., at atmospheric pressure but in the absence of oxygen, will yield a carbon residue amounting to at least 80% of the solid material.

In general, the type of pitches which are suitable are known as coal tar pitches, although pitches within the class have been produced from other sources, such as mineral oil pitches and petroleum pitches. Coal tars are also included within the class useful for the practice of the invention and are particularly suitable for impregnation.

The oxidizing agents which may be reacted with the pitch theoretically include all oxidizing agents, but in practical application some oxidizing agents are, of course, much more desirable and practical than others. Chlorates, because of their explosive characteristics, are not particularly desirable. Similarly, gaseous oxidizing agents create a class of special problems in connection with the difficulty of providing an intimate reaction mixture. Other oxidants are too volatile or unstable for most practical applications. The halogens are not only volatile but also enter into substitution reactions with the hydrocarbons and are, therefore, not very efficient.

In practice, I have found that organic oxidizing agents, particularly aromatic compounds containing nitro groups, are suitable. Polynitrobenzene compounds, such as m-dinitrobenzene, are especially desirable.

The porous material to be impregnated may be any suitable material wherein it is desired to wholly or partially fill the pores with a resin. The invention is particularly applicable to materials having relatively fine pores, which themselves have characteristics of resistance to relatively high temperatures, and which are inert or partially inert with respect to many chemicals. The invention is particularly applicable to ceramic materials and also to formed objects made of carbon, such as carbon pipe.

In accordance with the invention, the reaction ingredients comprising the coal tar pitch and the oxidizing agent, are mixed together and heated to a temperature normally in the range of 100–125° C., at which the mixture is fluid. The fluidity should be such that the viscosity of the fluid does not prevent or substantially interfere with the introduction of the fluid into the pores of the material to be impregnated. On the other hand, the mixture should not have too low a viscosity, since otherwise it may be readily introduced into the porous material but will drain too freely from the pores in the later steps of curing of the resin. Thus the extent of fluidity of the mixture and the desired viscosity thereof depends to a considerable extent upon the size of the pores in the material to be impregnated.

Other complications which may enter into the impregnation are that the resin formed is a condensation type of resin and gas is evolved as cure of the resin progresses. If the evolution of gas is very extensive or very rapid, it may tend to force the resin from the pores of the material while the resin is still in a fluid state. Similarly, the "pot life" of the mixture of reactants is important in that the mixture should remain fluid for considerable periods of time so that a series of articles may be impregnated from a single reaction mixture. Preferably, the pot life of the mixture, during which the mixture remains fluid with a viscosity in the desirable range, should be in the neighborhood of 24 hours. In any event, it is desirable to have a pot life of at least several hours.

For impregnation, it is particularly desirable to have a very soft pitch. The pitch should have a draw point below 50° C. Preferably the pitch is fluid at 25° C.

In determining the draw point of a resin or of a pitch, a block of metal, fitted with a device for measuring its temperature, is heated sufficiently to allow the application of a thin layer, or smear, of fusible resin or pitch. The metal block then is allowed to cool while a sharp metal point is drawn across the surface of the smear. The minimum temperature at which a mark or "draw line" can be observed to be made by the metal point is the draw point of the resin or pitch. It is this index to which I refer by the use herein of the term "draw point."

It has been found that the draw point is related to more conventional properties such as softening or melting point, flow rate, etc. Determination of draw point has the advantage as a criterion of degree of cure over other tests in that it can be carried out in a few minutes while a polymerization reaction is being carried out.

A fully cured or thermoset state is indicated by the lack of manifestation of fluidity of the resin at 375° C.

A convenient test to determine whether a resin manifests fluidity is to place a few particles or granules of crushed resin on a metal block preheated to 375° C. If in the course of a few seconds the irregular particles coalesce or contract in the manner of a liquid into minimum volume and approach spherical shape, the resin has not been thermoset. If, on the other hand, the irregular shape of the particles is retained, the material is thermoset, fully cured, and infusible even though further hardening may occur.

It is a critical feature of the present invention that the thermoset or fully cured and infusible state be accomplished after the highly fluid resin has penetrated the porous body and the thermosetting must be uniform throughout the entire body of the resin. In other words, it does not suffice if merely an exterior portion of the body be oxidized; the conversion to the infusible state must be uniform throughout the impregnating resin so as to insure the retention of the resin within the porous body.

In the present invention, I have found that coal tar is particularly desirable as a reaction ingredient. Coal tar has the characteristic of being fluid at a lower temperature than many other pitches, especially those derived from the redistillation of tar, and also tends to react with the oxidizing agent more readily than some of the coal tar pitches of commerce.

When coal tar is mixed with an oxidizing agent such as polynitrobenzene, it is found that the mixture is fluid and has a relatively low viscosity at a temperature of 100° C. If this mixture were introduced at this temperature into the pores of a porous material, it would readily penetrate the pores but would probably drain excessively while the porous material was being heated to advance the cure of the resin. However, by heating the mixture at a slightly higher temperature, for example, at a temperature in the neighborhood of 125° C., the coal tar and the oxidizing agent can be reacted to form a very slightly cured resin which itself is fluid, and at such a temperature possesses desirable characteristics of viscosity. The heating should be carried on until the rate of cure at the same temperature decreases as the heating is continued. At this point, as set forth in my copending application, Serial No. 339,968, filed March 3, 1953, now U.S. Patent No. 2,847,994, the rate of cure of the partially cured resin has leveled off and does not thereafter progress rapidly until and if the temperature is raised. At this point, a very desirable pot life is obtained, since the partially cured resin, fluid at the temperature of 125° C. and having a desirable viscosity at this temperature, is relatively stable and does not change rapidly in viscosity (which is dependent upon extent of cure) when the mixture is maintained at the same temperature.

It will be understood that the temperatures of 100° C. for the impregnation, and 125° C. for carrying out a partial curing until the rate of cure has leveled off, are cited by way of example only and because such temperatures are usually preferred for carrying out impregnations using soft pitches commonly available. However, in impregnating materials having relatively large pores, for which the penetration of impregnant is relatively less critical, it may be desirable, both to reduce drainage during subsequent completion of the cure and to obtain other advantages hereinafter described, to use an impregnant of lower fluidity. In such cases, the somewhat greater degree of cure required to obtain the lower fluidity may be effected at a temperature higher than 125° C. until the rate of cure has leveled off, and the impregnation may be effected either at 100° C. or at a different temperature. The temperatures of effecting both the impregnation and the partial cure required to obtain any desired degree of fluidity and satisfactory pot life as hereinbefore described are substantially lower than 200° C., at which temperature cure progresses rapidly and the fluidity when the rate of cure has leveled off is too low for the penetration even of coarse porous materials. It is of the essence of my invention that the temperature of heating the reaction ingredients is selected so that the degree of fluidity after the rate of cure has leveled off is desirable for the penetration of the porous material at an impregnation temperature no higher than the temperature at which the ingredients have been heated.

It also appears that through the step of reacting the coal tar and the oxidizing agent to a moderate extent to increase the viscosity and thereby control drainage of the fluid mixture from the porous material, I have obtained additional desirable effects. In the course of the preliminary reaction, gas is evolved and thereafter, in the further cure of the resin within the porous material after impregnation has taken place, the evolution of gas is minimized. At the same time, the preliminary reaction serves to bind the oxidizing agent in the mixture. If the oxidizing agent is one which has a relatively high vapor tension at a temperature at which further cure is to be carried on, the preliminary reaction serves to minimize evaporation of the oxidizing agent.

In the case of polynitrobenzene, such as dinitrobenzene, the oxidizing agent has a relatively high vapor tension at temperatures which are desirable in the cure of the resin. Thus, dinitrobenzene has a relatively high vapor tension at 165° C. and a vapor tension in excess of atmospheric pressure at a temperature of about 300° C.

It is preferable in carrying out the invention to mix coal tar with dinitrobenzene in suitable proportions, such as, for example, 85% of coal tar and 15% of dinitrobenzene, and heat the reaction mixture to a temperature in the neighborhood of 125° C. The heating is then continued until the rate of cure of the resin, which is formed through the heating, and the corresponding change in viscosity, decreases as the heating is continued. The slightly cured resin is then introduced into the pores of the material to be impregnated. This introduction may be carried out by merely dipping the porous material in the fluid mixture, or preferably by evacuating the container with the mixture and the material to be impregnated therein, then immersing the material in the fluid mixture, and finally applying pressure to the container so as to force the mixture into the pores of the porous material.

When the porous material has been impregnated with the reaction mixture or with the partially cured but fluid resin, it is then heated to cure the resin therein. The heating should be carried out at a temperature substantially above the impregnating temperature, usually at a temperature in the neighborhood of 190° C. The temperature should be high enough to cure the resin in a moderate length of time. On the other hand, the cure should not be so rapid as to create rapid evolution of gas or to cause evaporation of the oxidizing agent if it possesses a relatively high vapor tension.

When the preliminary reaction to form a slightly cured resin is carried out before impregnation, then the problems of evaporation of the oxidizing agent and gas evolution are, of course, minimized, and the temperature may be raised more rapidly in the curing of the impregnated piece than would otherwise be the case.

After heating the impregnated material at a temperature in the neighborhood of 190° C. until the resin therein is no longer fluid, the temperature of the material may then be raised progressively to temperatures at which substantially complete cure of the resin is accomplished within a reasonable period of time, e.g., the material may be heated for approximately one hour at each of a series of temperatures constituting 10° increments over 190° C. until a temperature of 250° C. is reached. The impregnated material may then be held at 250° C. for a period of several hours, as a result of which the resin is substantially completely cured in the material. Although the range of temperatures over which the impregnated material is heated is preferably in the range of 190–250° C., as described, the curing may be started at a lower temperature than 190° C. and the heating continued to a temperature higher than 250° C. Thus, it has been found desirable in some cases to heat the impregnated material at a temperature of 170° C. for a period of one hour and then increase the temperature by 10° increments for each hour of heating until the temperature of 250° C. is reached. Similarly, after the impregnated article containing resin has been heated at 250° C., it may be further heated at higher temperatures if desired.

Thermoplastic resins formed in accordance with this invention may be those having no draw point, yet fusible between 275° and 400° C. Furthermore, such thermoplastic resins may have draw points between 150° C. and 275° C., but are potentially useful if they are low draw points, as, for example 150–165° C. Such resins at relatively low temperatures, because of their fluidity, are useful in connection with cellulosic fibrous fillers.

Thermoplastic resins of the invention may be formed by the reaction of pitch with a quantity of oxidizing agent which is insufficient in amount to bring about complete thermosetting. Such resins are therefore not thermosetting. On the other hand, thermosetting resins in which the oxidizing agent is not completely reacted and which are only partially cured are also thermoplastic. In either case, the thermoplastic resins are only partially cured as contrasted with thermoset resins and are particularly useful in molding compositions.

For example, if m-dinitrobenzene is used as oxidizing agent in amount equal to 14% of the pitch by weight, a product that is barely thermoset is obtained when the reaction is ultimately carried to completion. If only 11% is used, the final resin produced will not be ultimately completely thermoset, even when the resin-forming reaction has been carried to completion. However, the final product will soften only at very high temperatures and is useful where completely thermoset properties are not necessary.

For certain purposes less than 11% of the m-dinitrobenzene may give give valuable resinous products. For example, if 7.5% is used, the normal polymerizing reaction proceeds until the oxidizing agent is exhausted. At this point, the resin is only partially thermoset, being a thermoplastic like the "two-step" phenol-aldehyde resins. Unlike the phenolics, however, this resin is useful because of its high chemical resistance and relatively high softening point, in the neighborhood of 250° C. Resins of such hardness when suitably compounded with filler and molded, give formed articles which are fairly stable dimensionally at temperatures as high as 200° C., where some thermoset resins, such as phenolic, show evidence of instability.

The following are examples of my invention:

Example I

A one-inch cube of fine-grained ceramic brick, with 19.8% porosity, was heated to 120° C. and evacuated to 28.2 inches of vacuum. The brick sample then was immersed, without breaking the vacuum, in a mixture, also heated to 120° C., of 15 parts by weight of m-dinitrobenzene and 85 parts of a coal tar pitch with softening point of 41° C. Pressure on the surface of the impregnant then was raised to 50 pounds per square inch and held for 30 minutes, temperature of brick and impregnant being meanwhile maintained at 120° C. Thereafter, the brick sample was removed from the impregnant, drained until its surfaces were essentially free of excess impregnant, and placed in an oven at 190° C. for 24 hours. Thereafter, it was heated for an additional 24 hours at 210° C., after which the impregnant showed no tackiness. The brick now contained 25.1% of cured resin in its pores, and its porosity was only 0.5%. When the brick was fractured, inspection showed uniform distribution of impregnant throughout the mass of the sample.

Example II

A length of porous graphite pipe, approximately 1½ inch outside diameter with wall thickness of ¼ inch, was heated to 100° C. and evacuated to 28.0 inches of vacuum. Without breaking the vacuum, the pipe was immersed in an impregnant comprising 85 parts by weight of refined coal tar of commerce and 15 parts of m-dinitrobenzene, said mixture having been heated also to 100° C. The pressure on the surface of the impregnant was raised to, and held at 60 pounds per square inch for 30 minutes, temperature of pipe and impregnant being maintained at 100° C. The pipe then was removed from the impregnant and drained until its surfaces were essentially free of excess impregnant. The pipe, containing impregnant to the amount of 5.8% of the original weight of the pipe, then was placed in an oven and heated to form cured resin in the pores for one hour at 170° C., one hour at 180° C., 4 hours at 190° C., 17 hours at 200° C., then one hour at each 10° increment of temperature through 240° C., and finally 3 hours at 250° C. After the oven treatment, the pipe contained 5.7% of resin and showed no tackiness at 250° C. Its porosity was only 0.2% by volume, as compared with 8.5% before impregnation. It was essentially impervious to air at 40 pounds per square inch, whereas before impregnation the pipe had been readily permeable to gases.

*Example III*

A sample of asbestos-cement material cut from a sheet of the type commonly used for shingles or sheeting was brought to a temperature of 125° C. and evacuated to 27.5 inches of vacuum. A mixture, also heated to 125° C., of 15 parts by weight of m-dinitrobenzene and 85 parts by weight of a soft coal tar pitch, with softening point of 48° C., was used to completely immerse the sample of asbestos-cement material without breaking the vacuum. After complete immersion, the pressure at the surface of the impregnant was raised to 50 pounds per square inch and held at this level for 30 minutes while both the asbestos-cement material and the impregnant were kept at 125° C. The sample then was drained until the surfaces were free of excess impregnant, and weighed. It was found to contain impregnant in the pores to the extent of 18.0% of its original weight. The impregnated sample then was placed in an oven and heated successively for 23 hours at 190° C., 4 hours at 200° C., and for one hour at each of the following temperatures: 210° C., 220° C., 230° C., 240° C., and 250° C. Its surfaces appeared black and shiny, and it was found to contain cured resin to the extent of 14.4% of its original weight. Efficiency of impregnation was determined by measuring the capacity of the sample to absorb water when boiled in this fluid. Before impregnation, the water sorption had been found to be 15.0% of the weight of the material; after impregnation and curing in the oven, it was capable of sorbing only 0.4%.

*Example IV*

Advantages to be gained, as hereinbefore described, through preliminary reaction of the impregnant mixture at a temperature somewhat above the temperature of impregnation, have been shown by a series of experiments carried out with samples of asbestos-cement material of the type used in Example III. In these experiments, impregnation was effected by the vacuum-pressure technique essentially as described in Example III, except that the temperature of impregnation was 100° C. The samples were treated in three groups of three using three different impregnants prepared from the coal tar of commerce and m-dinitrobenzene in the proportions of 85 parts of tar and 15 parts of dinitrobenzene. For one group, the ingredients of the impregnant were mixed at 100° C., and the impregnation was carried out soon thereafter, the temperature of the impregnant never being raised above 100° C. For the other groups of samples, the constituents of the impregnant were mixed at 125° C., held at that temperature for varying periods of time up to 4 hours, then cooled to room temperature and reheated to 100° C. for the impregnations. After impregnation, all samples were drained in the same manner, and the resin in the voids was cured by heating through a schedule similar to that used in Example III except that it was carried to 275° C. Results obtained, together with treatment of the impregnants before use, are shown by the following tabulation of data, wherein the averages of results for the three samples of each group are given.

| Sample Group No. | Heating of Impregnant at 125° C. before use for Impregnation (hrs.) | Resin Pick-up (percent of sample weight) | Resin Content after Cure (percent of sample wt.) | Yield of Cured Resin (percent of impregnant introduced into sample) | Water Sorption |
|---|---|---|---|---|---|
| 1 | None (mixed at 100° C.). | 10.4 | 3.2 | 31.1 | 7.2 |
| 2 | 1 | 16.0 | 9.1 | 56.8 | 4.9 |
| 3 | 4 | 15.7 | 8.9 | 56.7 | 4.8 |

In this tabulation, the "pick-up" represents the amount of impregnant after draining but before curing which is in the pores and on the surface of the samples. Part of the material is lost during cure, both by further drainage and by loss inherent in the polymerization reaction. The loss due to reaction would vary but little among the impregnants, hence the "yield" is primarily a measure of the drainage during cure. Water sorption, which was 15.0% for all samples before impregnation, is essentially a measure of unfilled porosity.

It is evident, therefore, that even moderate heating at 125° C. increased the pick-up very materially by reducing the amount of drainage without significantly affecting the degree of penetration. Furthermore, during cure much less impregnant was lost by drainage due both to increased viscosity during cure and to a lesser tendency of condensation gases to force material out of the pores. Stability and good pot life of the impregnant is shown by the fact that heating at 125° C. did not adversely affect its usefulness as an impregnant. The optimum temperature and time of heating the impregnant before use varies with the porosity of the material being impregnated. Thus, for material coarser than the fine-grained asbestos-cement, heating for more than four hours, or heating at a temperature higher than 125° C., probably would be required to obtain maximum benefit.

*Example V*

The process was carried on as set out in the preceding examples except that the material impregnated was wood flour and the material was heated to produce a resin having a draw point of approximately 150° C., forming the resin in situ within the wood flour.

The impregnated material formed in accordance with this invention may contain a partially cured heat-curable resin which itself is solid at 25° C., and which has certain desirable characteristics of resistance to chemicals and to temperature. Ordinarily, however, the cure of the resin is carried on until it is substantially complete, at which point the resin is substantially infusible and relatively insoluble.

If the material which is impregnated itself possesses characteristics of temperature and chemical resistance greater than those of the resin, the resulting impregnated material will be exceptionally stable to heat and to numerous corrosive agents. Thus, at 350° C. the impregnated material will be essentially stable if the original porous material is stable at this temperature. Similarly, even at temperatures approaching red heat, e.g., 450° C., the resin will show only moderate weight loss and will not break down rapidly.

The resin is highly resistant to corrosive attack by such chemical agents as caustic solutions; oxidizing agents such as nitric and sulphuric acid; other acids such as hydrochloric and phosphoric; and solvents such as hydrocarbons and ketones. If the original porous material is inert to at least as great an extent as the resin, the resulting impregnated material will have the chemical resistance characteristic of my resin, which is set forth in greater detail in my copending application, Serial No. 298,611, filed July 12, 1952 (now abandoned).

The molding compositions of this invention are produced from the partially-cured, essentially hydrocarbonaceous resin material, which is thermoplastic and may or may not be thermosetting, solid at 25° C., although resins of a wider range of draw point may be used. Resins having draw points within the range of 150–275° C. and having 25–60% benzene-soluble components are particularly desirable.

Thermoplastic resins of the invention may be formed by the reaction of pitch with a quantity of oxidizing agent which is insufficient in amount to bring about complete thermosetting. Such resins are therefore not thermosetting. On the other hand, thermosetting resins in which the oxidizing agent is not completely reacted and which are only partially cured, are also thermoplastic. In either case, the thermoplastic resins are only partially cured, as contrasted with thermoset resins.

Although the invention has been illustrated in connection with certain specific reactions, ingredients and proportions of ingredients, it will be apparent that modifications and changes may be made without departing from the spirit and scope of the invention.

I claim:

1. A process for impregnating a porous material, comprising mixing a pitch-soluble oxidizing agent with an essentially hydrocarbonaceous pitch having at 25° C. a specific gravity of at least 1.02, said pitch, when heated for 72 hours at 450° C. in a closed vessel where distillation is not possible, yielding at least 60% of a solid material based on the weight of the pitch, said solid material, when heated to 950° C. at atmospheric pressure in the absence of oxygen, yielding a carbon residue amounting to at least 80% of said solid material, introducing said mixture in fluid condition into the pores of said porous material, heating said mixture while maintaining said oxidizing agent distributed uniformly throughout said mixture within the range of 165–400° C. for a time sufficient to obtain a reaction product having a draw point within the range of 150–275° C., whereby a partially-cured resin is formed and deposited within said material, and terminating said heating at a temperature below 400° C.

2. The process of claim 1 in which the heating is continued until the resin is rendered infusible within said porous material.

3. A process for impregnating a porous material, comprising mixing a pitch-soluble oxidizing agent with an essentially hydrocarbonaceous pitch having at 25° C. a specific gravity of at least 1.02, said pitch, when heated for 72 hours at 450° C. in a closed vessel where distillation is not possible, yielding at least 60% of a solid material based on the weight of the pitch, said solid material, when heated to 950° C. at atmospheric pressure in the absence of oxygen, yielding a carbon residue amounting to at least 80% of said solid material, said pitch being fluid at 25° C., heating said mixture at a temperature at which said oxidizing agent and said pitch react slowly, continuing said heating until a partially cured heat-curable resin is formed and the viscosity of the fluid mixture is substantially increased, introducing said fluid mixture with said oxidizing agent at least partially unreacted and distributed throughout said mixture into the pores of said material, continuing said heating for a time sufficient to obtain a reaction product having a draw point within the range of 150–275° C., and terminating said heating at a temperature below 400° C.

4. The process of claim 3 in which the draw point of the resinous reaction product is 150–165° C.

5. A process for impregnating a porous material, comprising mixing a pitch-soluble oxidizing agent with an essentially hydrocarbonaceous pitch having at 25° C. a specific gravity of at least 1.02, said pitch, when heated for 72 hours at 450° C. in a closed vessel where distillation is not possible, yielding at least 60% of a solid material based on the weight of the pitch, said solid material, when heated to 950° C. at atmospheric pressure in the absence of oxygen, yielding a carbon residue amounting to at least 80% of said solid material, impregnating said material with said pitch, and continuing the heating until there is formed within the material a partially cured, essentially hydrocarbonaceous, resinous material, being thermoplastic and a solid, manifesting no draw point at 275° C., and being fusible between the temperatures of 275–400° C., but discontinuing said heating before destroying said resin and below the temperature of 400° C.

6. A process for impregnating a porous material, comprising mixing a pitch-soluble oxidizing agent with an essentially hydrocarbonaceous pitch having at 25° C. a specific gravity of at least 1.02, said pitch, when heated for 72 hours at 450° C. in a closed vessel where distillation is not possible, yielding at least 60% of a solid material based on the weight of the pitch, said solid material, when heated to 950° C. at atmospheric pressure in the absence of oxygen, yielding a carbon residue amounting to at least 80% of said solid material, heating said mixture to a temperature at which said mixture is fluid, continuing the heating of said mixture until a partially cured, heat-curable resin is formed and until the rate of cure of the resin decreases with continued heating at said temperature, introducing said fluid mixture with said oxidizing agent at least partially unreacted and distributed throughout said mixture into the pores of said material, and heating said material to further cure said resin therein but discontinuing said heating before destroying said resin and below the temperature of 400° C.

7. A process for impregnating a porous material, comprising mixing a pitch-soluble oxidizing agent with an essentially hydrocarbonaceous pitch having at 25° C. a specific gravity of at least 1.02, said pitch, when heated for 72 hours at 450° C. in a closed vessel where distillation is not possible, yielding at least 60% of a solid material based on the weight of the pitch, said solid material, when heated to 950° C. at atmospheric pressure in the absence of oxygen, yielding a carbon residue amounting to at least 80% of said solid material, said pitch having a draw point below 50° C., heating said mixture to a temperature at which said mixture is fluid and said pitch and said oxidizing agent react slowly, continuing said heating at said temperature until a partially cured heat-curable resin is formed and the viscosity of the fluid mixture is substantially increased and the rate of cure of said resin decreases with continued heating at said temperature, introducing said fluid mixture with said oxidizing agent at least partially unreacted and distributed throughout said mixture into the pores of said material, heating said material to further cure said resin therein, and discontinuing said heating at a temperature below 400° C.

8. A process for impregnating a porous material, comprising mixing an organic oxidizing agent with an essentially hydrocarbonaceous coal tar pitch having a draw point below 50° C., heating said mixture to a temperature in excess of 100° C. to form a partially cured heat-curable resin and increase the viscosity of said mixture, continuing said heating at said temperature until the rate of cure of said resin decreases with continued heating, introducing said mixture with said oxidizing agent distributed uniformly therethrough into the pores of said material, slowly heating said material at progressively higher temperatures to further cure said resin therein, and discontinuing said heating at a temperature below 400° C.

9. A process for impregnating a porous material, comprising mixing an organic oxidizing agent with coal tar, fluid at 25° C., heating said mixture to a temperature in the neighborhood of 125° C. until a partially cured, heat-curable resin is formed with said oxidizing agent distributed uniformly therethrough, continuing the heating at said temperature until the rate of cure of said resin at said temperature decreases, introducing the resulting fluid resin into the pores of said material at approximately the same temperature, slowly heating said material to further cure said resin therein, and discontinuing said heating at a temperature below 400° C.

10. A process for impregnating a porous material, comprising mixing an organic oxidizing agent with an essentially hydrocarbonaceous pitch having at 25° C. a specific gravity of at least 1.02, said pitch, when heated for 72 hours at 450° C. in a closed vessel where distillation is not possible, yielding at least 60% of a solid material based on the weight of the pitch, said solid material, when heated to 950° C. at atmospheric pressure in the absence of oxygen, yielding a carbon residue amounting to at least 80% of said solid material, said pitch being fluid at 25° C., heating said mixture at a temperature in the neighborhood of 125° C. to form a partially cured, heat-curable resin and increase the viscosity of the fluid mixture, continuing said heating until the rate of cure of said resin at said temperature decreases, introducing said fluid resin with said oxidizing agent at least partially unreacted and distributed substantially uniformly throughout said mixture into the pores of said material, rapidly increasing the temperature of said material to a temperature in the neighborhood of 190° C., heating said material at said temperature of 190° C. for a substantial period of time, thereafter heating said material at progressively higher temperatures to 250° C. until the resin in said material is converted into the substantially infusible relatively insoluble state, and discontinuing said heating at a temperature below 250° C.

11. A process for impregnating a porous material, comprising mixing coal tar, fluid at 25° C. with dinitrobenzene, heating said mixture to a temperature in excess of 100° C., introducing said mixture into the pores of said material, heating said material with said mixture therein to form a cured resin in said material, and discontinuing the heating of said material at a temperature below 400° C.

12. A process for impregnating a porous material, comprising mixing coal tar, fluid at 25° C., with dinitrobenzene, heating said mixture to a temperature in the neighborhood of 125° C. to form a partially cured, heat-curable resin and increase the viscosity of the fluid mixture, continuing said heating at said temperature until the rate of cure of said resin at said temperature decreases, introducing said mixture into the pores of said material, rapidly raising the temperature of said material to a temperature in the neighborhood of 190° C., heating said material at said temperature of 190° C. for a substantial period of time, thereafter progressively increasing the temperature of said material to a temperature of 250° C. to further cure said resin, and discontinuing said heating at a temperature below 250° C.

13. A process for impregnating a porous material, comprising mixing a pitch-soluble oxidizing agent with an essentially hydrocarbonaceous pitch having at 25° C. a specific gravity of at least 1.02, said pitch, when heated for 72 hours at 450° C. in a closed vessel where distillation is not possible, yielding at least 60% of a solid material based on the weight of the pitch, said solid material, when heated to 950° C. at atmospheric pressure in the absence of oxygen, yielding a carbon residue amounting to at least 80% of said solid material, said pitch having a draw point below 50° C., heating said mixture at a temperature at which said oxidizing agent and said pitch react slowly, continuing said heating until a partially cured, heat-curable resin is formed and the viscosity of the fluid mixture is substantially increased, subjecting said material to vacuum, applying said fluid mixture with said oxidizing agent partially unreacted and distributed throughout said mixture to said material while maintaining the vacuum therein, whereby said fluid mixture is introduced into the pores of said material, applying pressure to said material to force the fluid mixture into said pores, thereafter slowly heating said material at progressively higher temperatures until the resin therein is converted to the substantially infusible relatively insoluble state, and discontinuing said heating at a temperature below 400° C.

14. An impregnated product, comprising a material having a large number of small pores therein partially filled with an essentially hydrocarbonaceous resin, said resin being partially cured, solid at 25° C., and having also 25–60% of benzene-soluble components.

15. An impregnated product, comprising a material having a large number of small pores therein partially filled with an essentially hydrocarbonaceous resin, said resin being thermosetting, and solid at 25° C., having a draw point within the range of 150–275° C., and having 25–60% of benzene-soluble components.

16. An impregnated product, comprising a material having a large number of relatively small pores therein at least partially filled with an essentially hydrocarbonaceous resin, said resin being cured and thermoset, being solid at 25° C., having less than 35% benzene-soluble components, manifesting no fluidity at 375° C., and yielding a carbon residue of at least 6% and substantially less than 100% by weight when heated to 950° C.

References Cited in the file of this patent

UNITED STATES PATENTS

| 1,155,443 | Rosen | Oct. 5, 1915 |
| 2,527,596 | Shea | Oct. 31, 1950 |

FOREIGN PATENTS

| 26,426 | Great Britain | 1912 |

OTHER REFERENCES

Abraham: "Asphalt and Allied Substances," 5th ed., 1945, pages 605–607.